(12) United States Patent
Schwartzkopf (10) Patent No.: US 7,188,310 B2
(45) Date of Patent: Mar. 6, 2007

(54) AUTOMATIC LAYOUT GENERATION FOR PHOTOBOOKS

(75) Inventor: Wade Schwartzkopf, Fairfax, VA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 413 days.

(21) Appl. No.: 10/681,221

(22) Filed: Oct. 9, 2003

(65) Prior Publication Data
US 2005/0081145 A1 Apr. 14, 2005

(51) Int. Cl.
G06F 17/00 (2006.01)
(52) U.S. Cl. .............. 715/517; 715/513; 715/501.1
(58) Field of Classification Search ......... 715/517, 715/513, 501.1, 788; 707/102
See application file for complete search history.

(56) References Cited

U.S. PATENT DOCUMENTS

| | | | | |
|---|---|---|---|---|
| 4,679,155 A | * | 7/1987 | Mitsuka | 382/295 |
| 4,928,252 A | * | 5/1990 | Gabbe et al. | 358/1.2 |
| 5,214,755 A | * | 5/1993 | Mason | 715/520 |
| 5,263,132 A | * | 11/1993 | Parker et al. | 715/542 |
| 5,289,570 A | * | 2/1994 | Suzuki | 715/521 |
| 5,293,475 A | * | 3/1994 | Hennigan et al. | 715/517 |
| 5,430,832 A | * | 7/1995 | Imaizumi et al. | 345/620 |
| 5,459,826 A | * | 10/1995 | Archibald | 715/517 |
| 5,517,621 A | * | 5/1996 | Fukui et al. | 715/517 |
| 5,548,692 A | * | 8/1996 | Cok | 715/815 |
| 5,557,728 A | * | 9/1996 | Garrett et al. | 715/801 |
| 5,685,002 A | * | 11/1997 | Sano | 715/517 |
| 5,710,896 A | * | 1/1998 | Seidl | 715/744 |
| 5,742,837 A | * | 4/1998 | Fukui et al. | 715/517 |
| 5,897,644 A | * | 4/1999 | Nielsen | 715/513 |
| 5,900,002 A | * | 5/1999 | Bottomly | 715/517 |
| 5,930,811 A | * | 7/1999 | Nojima et al. | 715/517 |
| 5,956,738 A | * | 9/1999 | Shirakawa | 715/517 |
| 6,014,137 A | * | 1/2000 | Burns | 715/747 |
| 6,014,458 A | * | 1/2000 | Wang | 382/176 |
| 6,026,417 A | * | 2/2000 | Ross et al. | 715/517 |
| 6,043,817 A | * | 3/2000 | Bolnick et al. | 715/788 |
| 6,058,248 A | | 5/2000 | Atkins et al. | |
| 6,075,926 A | | 6/2000 | Atkins et al. | |

(Continued)

OTHER PUBLICATIONS

J. Kustanowitz et al., "Bi-level hierarchical layouts for photo libraries: Algorithms for design optimization with quantum content," Univ. of Maryland Technical Report, Copyright 2005, 11 pages.*

(Continued)

*Primary Examiner*—Doug Hutton (57) ABSTRACT

A method and system for the automatic layout of a photobook page are disclosed. The method includes receiving a number of images for placement onto the photobook page, the photobook page having a first dimension and a second dimension wherein the first dimension is greater than the second dimension. A square root of the number of images is approximated. A total number of page divisions is determined along the first dimension of the photobook page, wherein the total number of page divisions correspond to the approximated square root. Each photobook page is evaluated for division into a regular array of image areas using a modulus of the number of images and the square root. A number of image areas to be included in a page division is determined using a ratio of the number of images to the approximated square root. The images are distributed automatically on the photobook page among the multiple image areas.

23 Claims, 6 Drawing Sheets

U.S. PATENT DOCUMENTS

| | | | |
|---|---|---|---|
| 6,202,061 B1 * | 3/2001 | Khosla et al. | 707/3 |
| 6,222,947 B1 * | 4/2001 | Koba | 382/284 |
| 6,289,361 B1 * | 9/2001 | Uchida | 715/501.1 |
| 6,324,545 B1 * | 11/2001 | Morag | 707/202 |
| 6,334,187 B1 * | 12/2001 | Kadono | 713/176 |
| 6,380,954 B1 * | 4/2002 | Gunther | 715/764 |
| 6,396,963 B2 * | 5/2002 | Shaffer et al. | 382/305 |
| 6,453,078 B2 * | 9/2002 | Bubie et al. | 382/305 |
| 6,535,294 B1 * | 3/2003 | Arledge et al. | 358/1.15 |
| 6,571,054 B1 * | 5/2003 | Tonomura et al. | 386/95 |
| 6,590,586 B1 * | 7/2003 | Swenton-Wall et al. | 715/730 |
| 6,596,032 B2 * | 7/2003 | Nojima et al. | 715/517 |
| 6,620,206 B1 * | 9/2003 | Seaman et al. | 715/518 |
| 6,625,611 B1 * | 9/2003 | Teig et al. | 707/102 |
| 6,636,648 B2 * | 10/2003 | Loui et al. | 382/284 |
| 6,636,650 B1 * | 10/2003 | Long et al. | 382/295 |
| 6,741,270 B1 * | 5/2004 | Rzepkowski et al. | 715/810 |
| 6,745,186 B1 * | 6/2004 | Testa et al. | 707/7 |
| 2002/0040375 A1 * | 4/2002 | Simon et al. | 707/517 |
| 2002/0051208 A1 * | 5/2002 | Venable | 358/1.18 |
| 2002/0095439 A1 * | 7/2002 | Long et al. | 707/507 |
| 2002/0111963 A1 * | 8/2002 | Gebert et al. | 707/513 |
| 2002/0122067 A1 * | 9/2002 | Geigel et al. | 345/788 |
| 2003/0009728 A1 * | 1/2003 | Marple | 716/2 |
| 2003/0058278 A1 * | 3/2003 | Allen et al. | 345/765 |
| 2003/0229845 A1 * | 12/2003 | Salesin et al. | 715/500 |
| 2004/0006743 A1 * | 1/2004 | Oikawa et al. | 715/513 |
| 2004/0263533 A1 * | 12/2004 | Yamamoto et al. | 345/619 |
| 2005/0091599 A1 * | 4/2005 | Yamakado et al. | 715/732 |

OTHER PUBLICATIONS

C. Jacobs et al.,"Adaptive Grid-Based Document Layout", 2003, ACM pp. 838-847.*

* cited by examiner

AUTOMATIC LAYOUT GENERATION FOR PHOTOBOOKS

BACKGROUND

Photobook software applications are available which can accomplish aspects of photobook creation such as automatic layout, addition of annotations and printing of the photobook or publication to a website. Printed photobooks can be bound and printed with text annotations. Available photobook services on the World Wide Web allow the user to arrange their photos into a photobook with annotations with a few automated features. These web services then print the user's photobook and deliver the photobook to the user.

Examples of web photobook services include www.printlife.com, www.ememories.com and www.photoworks.com. The photoworks service allows a user to assemble digital photos one to a page in a printed photobook, with a title page, which is then mailed to the user.

Other photobook software can be downloaded or purchased to assist the user in arranging photos and printing the photos as a book or publishing the photos on a website. One example of photobook software is the PhotoRecord™ software distributed with certain Canon™ digital cameras and printers. The PhotoRecord™ software includes some automatic layout of the photographs on the pages of a photobook and printing of the photographs in a photobook.

Kodak® Auto Album and Kodak® Memory Album software provides basic photo album creation capabilities including simple auto layout where the user can change the page layout templates. The final printed photobook is then available by mail.

SUMMARY

A method for automatic layout of a photobook page is disclosed. An exemplary method includes receiving a number of images for placement onto the photobook page, the photobook page having a first dimension and a second dimension wherein the first dimension is greater than the second dimension; approximating a square root of the number of images; determining a total number of page divisions along the first dimension of the photobook page, wherein the total number of page divisions corresponds to the approximated square root; evaluating whether the photobook page is to be divided into a regular array of image areas using a modulus of the number of images and the square root; determining a number of image areas to be included in a page division using a ratio of the number of images to the approximated square root; and distributing the images automatically on the photobook page among the multiple image areas.

In an exemplary embodiment, a computer readable medium having a program for producing a photobook by executing a procedure is disclosed. The procedure includes receiving a number of images for placement onto the photobook page, the photobook page having a first dimension and a second dimension wherein the first dimension is greater than the second dimension; approximating a square root of the number of images; determining a total number of page divisions along the first dimension of the photobook page, wherein the total number of page divisions corresponds to the approximated square root; evaluating whether the photobook page is to be divided into a regular array of image areas using a modulus of the number of images and the square root; determining a number of image areas to be included in a page division using a ratio of the number of images to the approximated square root; and distributing the images automatically on the photobook page among the multiple image areas.

An exemplary system for automatic layout of a photobook page having a first dimension and a second dimension, wherein the first dimension is greater than the second dimension, comprises means for receiving a number of images for placement onto a photobook page; and means for processing the images to approximate a square root of the number of images, to determine a total number of page divisions along the first dimension of the photobook page wherein the total number of page divisions corresponds to the approximated square root, to establish whether the photobook page is to be divided into a regular array of image areas using a modulus of the number of images and the square root; and to determine a number of image areas to be included in a page division using a ratio of the number of images to the approximated square root, wherein the processing means distributes the images automatically on the photobook page among the multiple image areas.

BRIEF DESCRIPTION OF THE DRAWING FIGURES

Preferred embodiments will now be described in greater detail with reference to the accompanying drawings, in which like elements bear like reference numerals, and wherein.

DETAILED DESCRIPTION

Figure 1A:
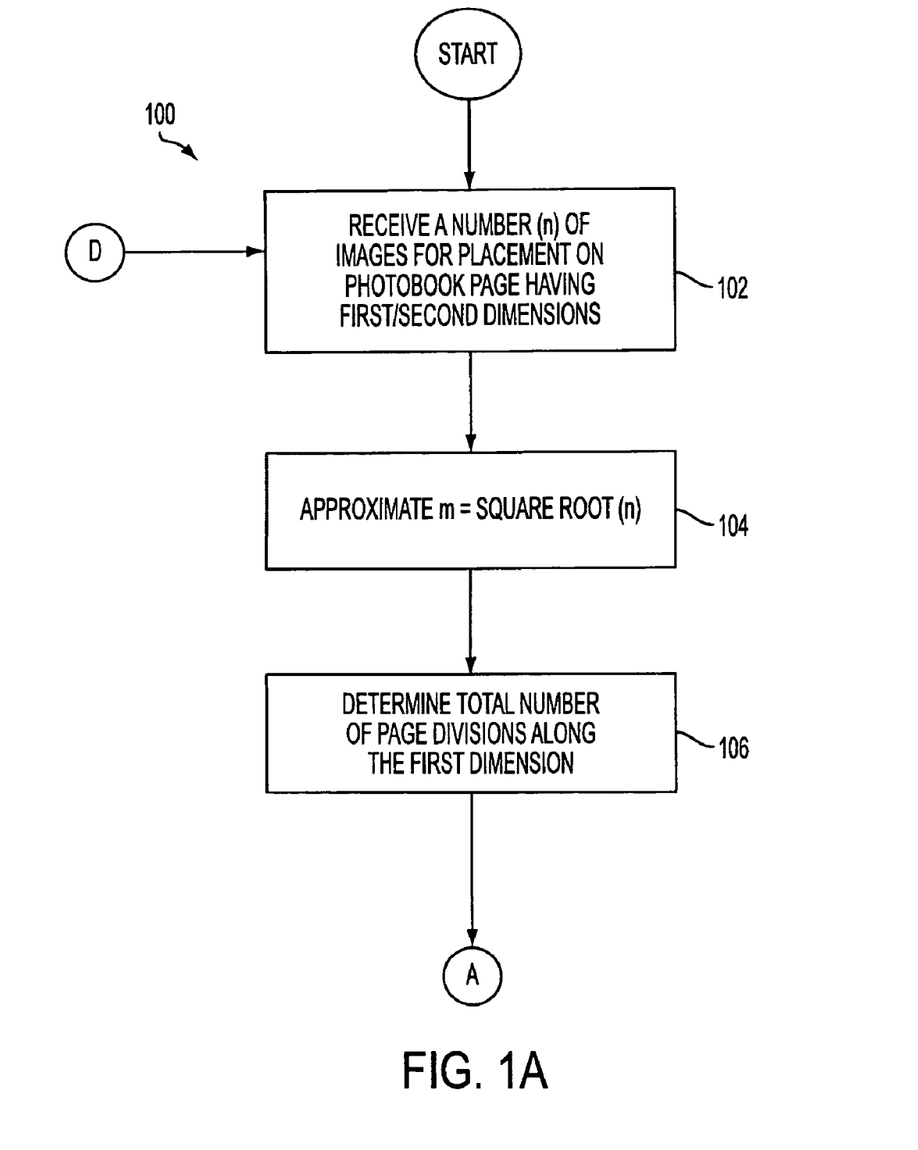
FIGS. 1A–1D illustrate an exemplary method for automatically laying out a page of a photobook.

FIG. 1A illustrates an exemplary method 100 for automatically laying out a page of a photobook. In an operation 102, a number (n) of images are received from a source (for example, images from a user, digital camera or the like) for placement on a photobook page and can be optionally stored on any device having memory. The photobook page includes a first dimension and a second dimension where the first dimension is greater than the second dimension. In operation 104, the method 100 approximates a square root "m" of the number of images "n".

Figure 3:
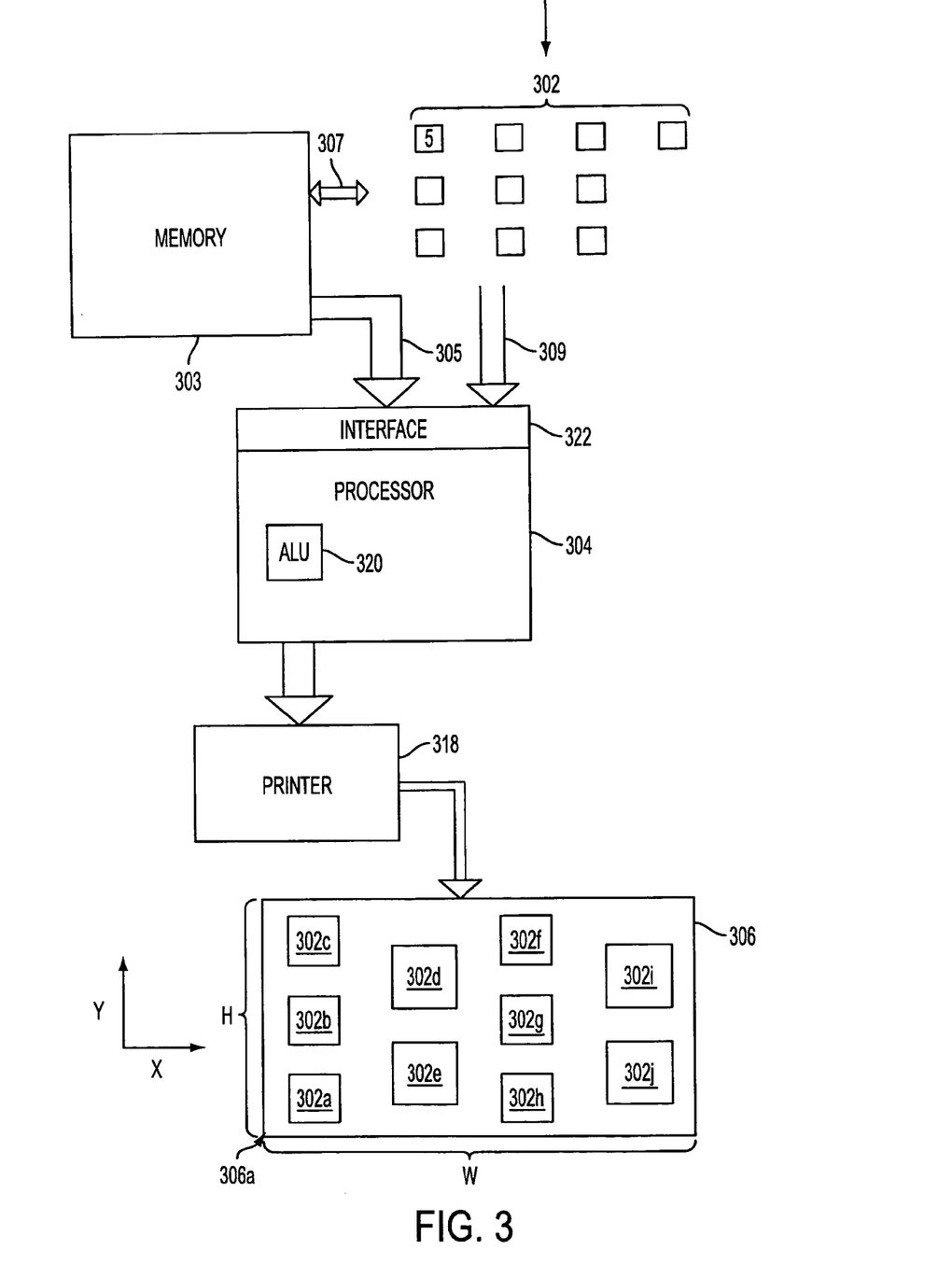
FIG. 3 is an exemplary embodiment of a system for generation of a photobook page.

With reference to FIG. 3 and the system 300 shown therein, means are provided for receiving images 302 from, for example, memory 303 via a path (such as a computer bus) 305 and an input, such as any suitable interface 322 including but not limited to an external connection or an internal bus interface of the processor 304. The images can be input to the memory 303 via path 307, or alternately, can be supplied directly to the interface 322 via a path 309.

The FIG. 1 method 100 can be implemented by the processor 304. The processor 304 can be any device capable of selecting and/or receiving images local or remote to the processor, such as a personal computer or the like. The images 302 can be received as any type of digital information stored in memory, such as digital photographs, scanned films and articles, photographs, slides, electronic documents or the like, or can be analog images which are converted to a digital format. The images can also be any type of electronic document, such as text, graphs, tables, and the like.

In this example, the processor 304 receives ten images in the operation 102. In the operation 104, the processor 304 approximates (for example, by rounding up or rounding down to the nearest integer) the square root m of the number of images 302. For example, where rounding up is used, the square root is approximated as 4($\lceil\sqrt{10}\rceil$=4) using means for mathematically processing, such as an arithmetic logic unit 320, within the processor 304.

Once the square root of the number of images is approximated, the processor 304 determines a total number of page divisions along the first dimension of the photobook page. In an exemplary embodiment, the total number of page divisions is determined in the FIG. 1A operation 106, and corresponds to the approximated square root.

The first dimension and the second dimension of the photobook page can be provided by manual input via a user interface of the processor 304, such as a keyboard, a touch screen, a scanner used for scanning of a photobook sheet of desired dimensions, or via any suitable input device. The first dimension and the second dimension can be stored in the memory 303, and can correspond to any dimension of the photobook page such as the height (that is, the length) of the photobook page, and the width of the photobook page, as determined when viewing the page in a desired orientation for inclusion in a photobook.

Where, for example, the height and width dimensions for a given orientation of the page in a photobook have been provided, the processor 304 can ascertain whether the height of the photobook page is greater than the width of the photobook page. If the page height is greater than the page width, then the axis along the height of the page is the first dimension and is assigned as the major axis of the page. An axis along the width is the second dimension and is assigned as the minor axis of the page. Otherwise, an axis along the width is assigned as a major axis and an axis along the height is assigned as the minor axis.

During implementation of the method 100, dimensions for a photobook page 306 can be supplied from memory 303 to the processor 304 or any other suitable input. In this example, the photobook page 306 has a dimension H (for example, a height of 8.5 inches) and a dimension W (for example, a width of 11 inches). The processor 304 determines that the width of the photobook page 306 is greater than the height. Thus, the width of the photobook page is assigned as the major axis and the height is assigned as the minor axis.

Figure 1B:
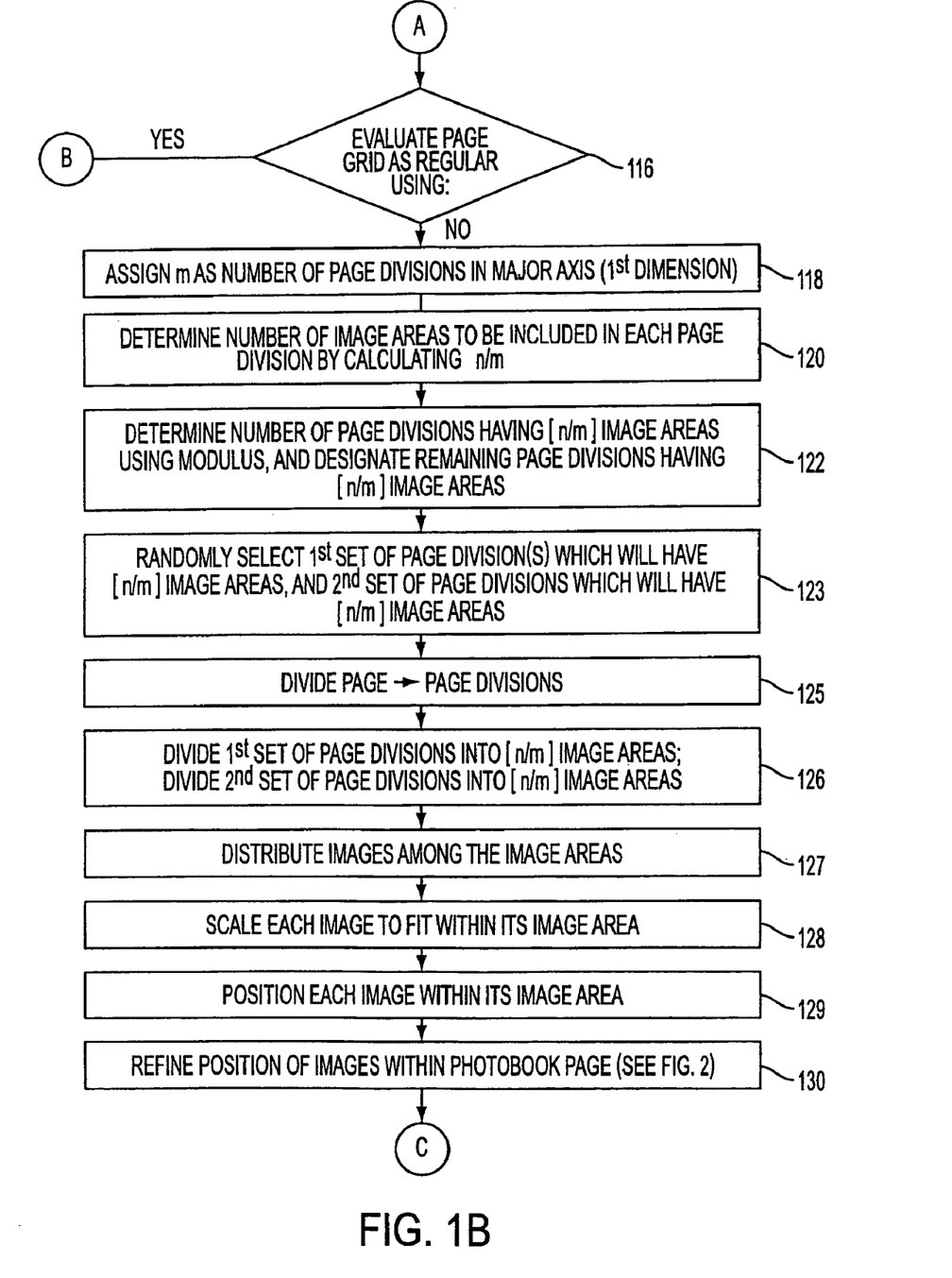

In the exemplary FIG. 1B flow chart, after the number of page divisions along the first dimension have been determined, operation 116 is performed wherein the method 100 evaluates each page to determine whether a resulting grid of image areas will be regular or irregular. A regular grid is one wherein each page division possesses the same number of image areas. For "n" images, where the modulus is calculated as the remainder of n/m, "n modulus m" will be zero for a regular array.

In addition to being used to identify a page grid as regular or irregular, the modulus is used in the flow chart of FIG. 1B to determine the number of page divisions which will have multiple image arrays. If, for example, n=1 or 2, the result of the FIG. 1B operation is that the grid will be regular since the remainder of n/m is zero, and so there is no determination of multiple image areas within a page division. If n=3, the result of the operation 116 is that the grid will be irregular since "n modulus m" is not zero, (that is, the remainder of n=3/m=2 is 1), and there is a determination of multiple image areas within one of the two page divisions. If n=4, "n modulus m" is zero such that the resultant grid is regular, and there are multiple image areas within each page division. If n=5, "n modulus m" is non-zero (that is, the remainder of n=5/m=3 is 2) such that the resultant grid is irregular and there are multiple image areas in two of the three page divisions. Before discussing the determination of multiple images in an irregular array, the determination of multiple image areas in a regular array will be discussed.

Figure 1C:
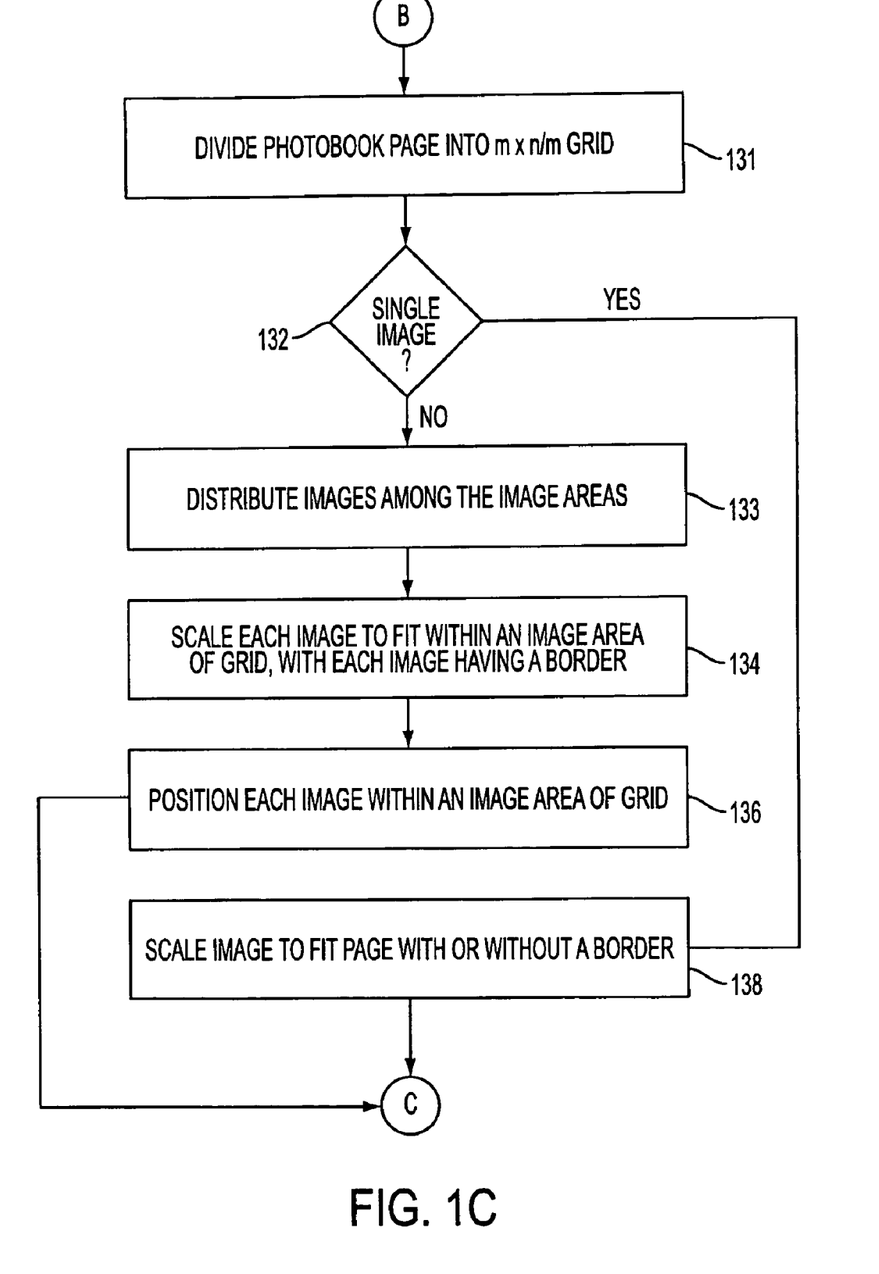

When the method 100 determines that a regular array, or grid, of image areas can be established on the page, the method 100 performs an operation 131 of FIG. 1C. Otherwise, when the method 100 determines in the operation 116 that an irregular grid of image areas is to be established, the method 100 performs an operation 118. Those skilled in the art will appreciate that the exact order of operations shown in the method 100 is by way of example only, and that these operations can be repositioned in any manner desired.

Where the method 100 determines in operation 116 that the grid is regular, the method 100 divides the photobook page into a regular array (for example, rectangular array) or grid of image areas, in operation 131 of FIG. 1C. The images are then distributed among the image areas. The grid is laid out using the approximated square root "m" of the number of images from operation 106 to create the divisions of the grid along the first dimension. A ratio of the number of images "n" to the approximated value of the square root of the number of images "m" can be used to establish the number of image areas within divisions of the grid along the second dimension (that is, n/m).

For example, where twelve images are provided, an approximated (for example, rounded up) square root of the number of images is four ($\lceil\sqrt{12}\rceil$=4). Thus, a first value used to lay out the page divisions along a major axis of the grid is four (that is, four page divisions are established along the major axis). The method 100 determines the second value by dividing the number of images (n=12) by the approximated square root value (m=4) for a second value of three (12/$\lceil\sqrt{12}\rceil$=3). Thus, the minor axis of the grid includes three image areas in each page division. As such, the method 100 lays out the photobook page with a regular grid of four-by-three image areas.

In the operation 132, the method 100 determines whether there is only a single input image (for example, only one image is provided in the operation 102 such that n=1). If only one image is provided, the method 100 performs an operation 138 where the image is scaled to fit the photobook page with, or optionally without, a border. During the operation 138, the images can be scaled using any suitable technique, such as a data resolution synthesis algorithm as disclosed in U.S. Pat. Nos. 6,058,248 and 6,075,926, the disclosures of which are hereby incorporated by reference in their entireties. With such an algorithm, image processing using image interpolation such as colorimetry constructs and multidimensional color space data interpolation can be used. These interpolation techniques include specifying an interpolating function which approximates the original image by sampling across a range of the source image data. During scaling operations, the aspect ratio of the image can, if desired, be changed. The scaling operations can include either upscaling or downscaling as desired, and as suitable for the image area under consideration.

When the method 100 determines that more than one image has been provided in operation 102, the method 100 performs a distribution of the images among the image areas in operation 133, and performs similar scaling operation 134. In operation 134, the method 100 scales each image to fit within a designated image area having a border in a manner similar to that discussed with reference to the operation 138. The method 100 then positions each image within a designated image area of the grid in the operation 136. Upon completion of either the operation 136 or the operation 138, the method 100 performs an operation 140 to output the photobook page.

Referring to FIG. 1B and the operation 116, when the method 100 determines that an irregular array of image areas is to be established, the method 100 performs a different procedure for establishing image areas, beginning with operation 118. This would be the case where, for example, a modulus between a number of images (e.g., 10 images) and an approximated square root of the number of images (e.g., m=4) is 2.

In operation 118, a grid for an irregular array is established by assigning the number of page divisions determined along the first dimension of the photobook in operation 106 to a major axis of the photobook page. This operation of actually assigning page divisions can, of course, optionally be performed in operation 106, at the same time the total number of page divisions are determined. The major axis corresponds to the greater dimension, such as a first dimension, of the photobook page to which a layout is to be applied. For example, with an approximated square root m=4, the method 100 assigns four as the number of page divisions used to establish image areas along a major axis in the operation 118. In this example, the dimension W is greater than the dimension H of the photobook page.

After completing operation 118, the method 100 performs an operation 120 which evaluates each page division for further division into a multiple number of image areas by calculating rounded-up and rounded-down approximations of the ratio of n/m. In operation 120, the page will be divided into page divisions having different numbers of image areas.

To determine the number of image areas in each page division in operation 120, the method can take a ratio between the number of images "n" and the approximated square root "m" of the number of images and round up this ratio to select the number of image areas in a first set of page divisions. Likewise, in the operation 120, the method rounds down the ratio between the number of images "n" and the approximated square root "m" of the number of images to select the number of image areas in a second set of page divisions. For example, with n=10 and m=4, the rounded up n/m=$\lceil n/m \rceil$=3, and the rounded down n/m=$\lfloor n/m \rfloor$=2.

In operation, 122, the method uses the modulus calculated in operation 116 to determine the number of page divisions which will have the rounded up $\lceil n/m \rceil$ number of image areas, and the number of page divisions which will have the rounded down $\lfloor n/m \rfloor$ number of image areas. Where "n modulus m" results in a non-zero value, the modulus will represent the number of the page divisions to be designated as having a number of image areas corresponding to the rounded up ratio, and the remaining number of page divisions will be designated as having a number of images corresponding to the rounded down ratio. In an example with 11 images, and four page divisions (m=4), "n modulus m" is equal to 3. The method will therefore determine that three page divisions will have the rounded up ratio of 3 image areas. The remaining page division will have a number of image areas corresponding to the rounded down ratio of 2.

In operation 123, a random selection is made for a first set of page divisions among the total divisions which will have the rounded up number of image areas (e.g., the first, second and third page divisions, or any three of the four page divisions). Similarly, by default, a second set of page divisions which have the rounded down number of image areas is selected. Thus, in the above example, the three page divisions which will have the 3 image areas are randomly selected.

In operation 125, the photobook page is divided using the grid into "m" page divisions, each having $\lceil n/m \rceil$ or $\lfloor n/m \rfloor$ image areas, as implemented in operation 126. In operation 127, the method distributes, or assigns, the images automatically on the photobook page among the multiple image areas.

The foregoing operation is also illustrated by reference to FIG. 3, wherein a first set of image areas are calculated by rounding up the ratio of the number of images 302 to the approximated square root of the number of images 302. The method 100 calculates the second set of image areas by rounding down the ratio of the number of images 302 to the approximated square root of the number of images 302. In this example, where the modulus is 2, the resulting number of image areas in a first set of two page divisions is determined to be three by rounding up the ratio of the number images "n" to the approximated square root "m" ($\lceil 10/\lceil\sqrt{10}\rceil \rceil$=3). Likewise, the resulting number of image areas in the second set of two remaining page divisions is determined to be two by rounding down the ratio of the number of images "n" to the approximated square root "m" ($\lfloor 10/\lceil\sqrt{10}\rceil \rfloor$=2). As such, the method results in a page having four page divisions, with three image areas in each of two page divisions and with two image areas in each of the remaining two page divisions (see FIG. 3).

In operation 128 of FIG. 1B, the method scales each image to fit within an image area in a manner as discussed with reference to the operation 138 of FIG. 1C. Once each image is scaled to fit within an image area, the method 100 performs operation 129 where each image is automatically positioned within an image area. Upon positioning each image within an image area (e.g., centered within the area, or at any desired initial position), the method 100 performs an operation 130. In the operation 130, the method refines positions of the images within the photobook pages.

Figure 2:
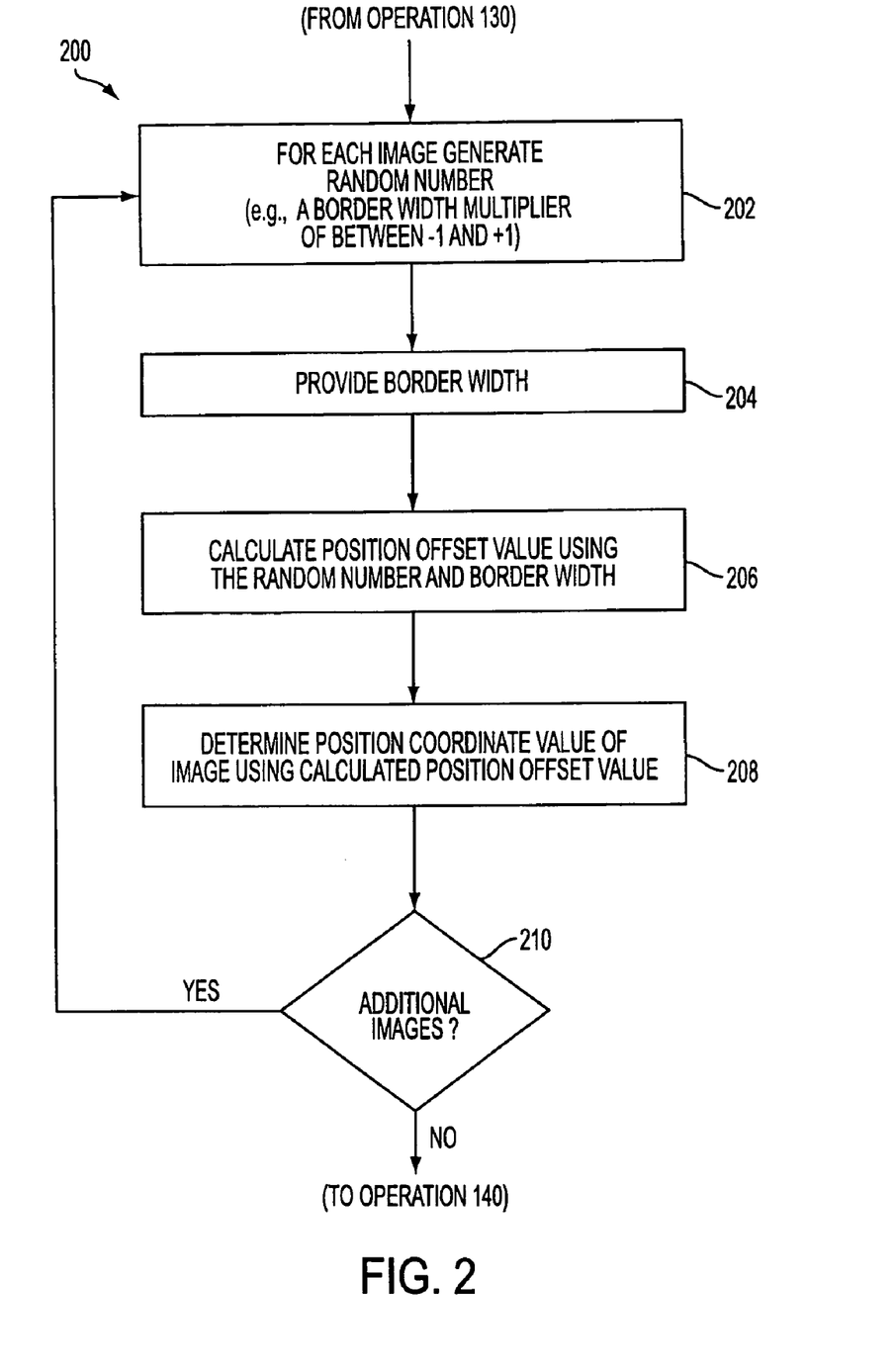
FIG. 2 is an exemplary operation shown with reference to FIG. 1B, which refines a position of images within a photobook page.

FIG. 2 is an exemplary embodiment illustrating the operation 130 and a method 200 which refines a position of images within a photobook page. The method 200 generates a random number between a positive border width and a negative border width in each of the two dimensions. In one example, a border width modifier of from negative 1 to positive 1 can be used as a border width multiplier in an operation 202. The method 200 provides a border width in an operation 204. Any border width desired can be used. For example, a border width input by the user can include, without limit, a border width which results when an image of given size is centered within its image area.

In operation 206, a position offset value is calculated using the random number and the border width value. In an exemplary embodiment, the position offset value provides positional movement of an image within an image area, and can be used to randomize the placement of the image within its image area on the page layout. Once the method 200 calculates the position offset value on a given image within a given image area in the operation 206, the method 200 determines a revised position coordinate value of the image in an operation 208. This procedure can be performed along each dimension of an image. The method determines whether or not additional coordinate values are to be determined for a given image, and/or for additional images on a page, in an operation 210. If the method 200 determines that additional coordinate values are to be determined, the method repeats operations 202 to 208. If the method 200 determines in the operation 210 that additional coordinate values need not be determined for a given page, the method 200 proceeds to the operation 140 of FIG. 1D.

As an example, assume that in operation 202, the method 200 generates a random number of, for example, 0.5 which is between −1 and 1 and which can be used as a border width modifier along a first dimension (e.g., height) of a given image. In the operation 204, a border width of 0.5 is provided (e.g., by the user, or automatically using some criterion, such as centering of the image). A position offset value is then calculated along the first dimension within the image area under consideration by multiplying the random number of 0.5 with the border width 0.5. As such, the method 200 calculates the position offset value as 0.25 (0.5×0.5). The method 200 then repeats this process for a second dimension (e.g., along the width) of the image area. For example, a random number of 0.1 can be selected for modifying the border width, where 0.1×0.5=0.05. New coordinate values are then determined for the image in the operation 208.

Making reference to FIG. 3, assume the image 302*a* placed on the photobook page 306 has initial x,y coordinate values of 2, 2 relative to the photobook page. In the operation 208, the image 302*a* is moved such that the coordinates are 2.25, 2.05. The coordinate system used for photobook page 306 is such that the dimension H defines a y axis and the dimension W defines an x axis. The coordinate system defined by the dimension H and the dimension W can, for example, be considered to have an origin at a point 306*a*. Once the method 200 determines the new coordinate value for an image using calculated position offset values, the method determines in the operation 210 that additional coordinate values are to be determined for the images 302*b* through 302*j*. As such, the method 200 repeats operations 202 to 208 for each of the images 302*b* to 302*j*. After repeating operations 202 through 208 for the images 302*b* through 302*j*, the method 100 performs the operation 140 of FIG. 1D.

Figure 1D:
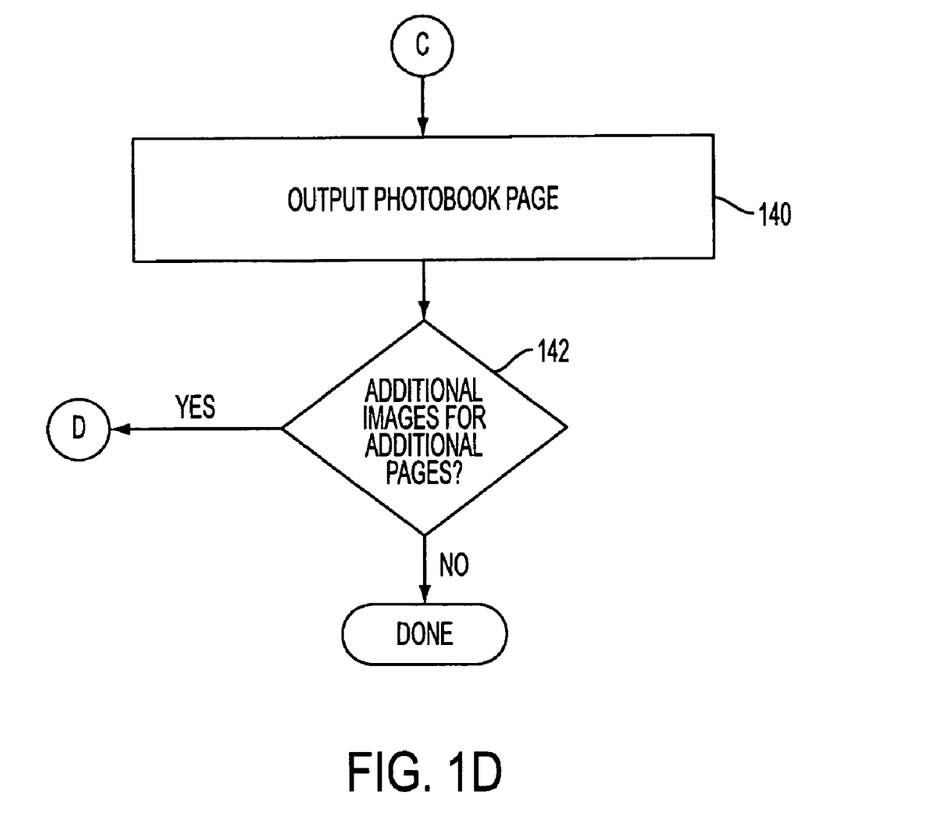

In operation 140, the method 100 outputs a page of the photobook. Upon completion of the operation 140, the method performs an operation 142 where the method 100 determines whether additional images for additional pages are necessary. If the method 100 determines that additional pages are necessary for additional images, the method repeats operations 102 through 142. Otherwise, the photobook page is complete.

The functionality described herein can be embodied by computer-executable instructions, such as program modules, that are executed by computers. Program modules can be stored, for example, that include routines, programs, objects, components, data structures, and so forth that perform particular tasks or implement particular abstract data types. The instructions and/or program modules can be stored at different times in various computer-readable media that are either part of a computer implementing the software application or that can be read by the computer. Programs can be stored, for example, on floppy disks, CD-ROMs, DVD, or any form of storage media, suitable for being loaded into the memory of a computer, or accessed by a computer.

Exemplary embodiments described herein include any type of computer-readable media suitable for containing programs, and/or modules for implementing the operations in a microprocessor or other data processor. Exemplary embodiments can also be implemented as a computer which has been programmed as described herein.

While the invention has been described in detail with reference to the preferred embodiments thereof, it will be apparent to one skilled in the art that various changes and modifications can be made and equivalents employed, without departing from the present invention.

What is claimed is:

1. A method for automatic layout of a photobook page comprising:
   receiving a number of images for placement onto the photobook page, the photobook page having a first dimension and a second dimension wherein the first dimension is greater than the second dimension;
   approximating a square root of the number of images by rounding the square root of the number of images;
   determining a total number of page divisions along the first dimension of the photobook page, wherein the total number of page divisions corresponds to the approximated square root;
   evaluating whether the photobook page is to be divided into a regular array of image areas using a modulus of the number of images and the square root;
   establishing a grid on the photobook page as a regular array when a modulus for the approximated square root and the number of images is zero;
   otherwise, determining a number of image areas to be included in a page division using a ratio of the number of images to the approximated square root, the number of image areas for an irregular array being based on a rounded-up approximation of the ratio for one set of page divisions, and a rounded-down approximation of the ratio for another set of page divisions; and
   distributing the images automatically on the photobook page among the multiple image areas.

2. The method of claim 1, comprising:
   when a modulus for the approximated square root and the number of images is greater than zero, establishing a grid on the photobook page as an irregular array, and evaluating each page division for further division into a multiple number of image areas.

3. The method of claim 2, comprising:
   selecting a first number of page divisions to have a first number of image areas, where the first number corresponds to the modulus; and
   selecting a second number of page divisions to have a second number of image areas, wherein the second number is different from the first number.

4. The method of claim 3, comprising:
   randomly selecting a first set of the page divisions from among the total number of page divisions to have the first number of image areas.

5. The method of claim 4, comprising:
   dividing the page into page divisions and multiple image areas.

6. The method of claim 5, comprising:
   scaling each image to fit within one of the multiple image areas; and
   positioning each image in a position within its image area.

7. The method of claim 6, comprising:
   refining the position of each image within its image area.

8. The method of claim 7, comprising:
   generating a random number for modifying a border width of each image.

9. The method of claim 8, wherein the random number is a border width modifier that is randomly selected for each image to be between −1 and +1.

10. The method of claim 8, comprising:
    providing a border width for an image; and
    calculating a position offset value for the image, wherein the position offset value is calculated using the border width and the random number.

11. The method of claim 10, comprising:
  determining a position coordinate value for the image using the position offset value.

12. A computer readable medium having a program for producing a photobook by executing the following procedure:
  receiving a number of images for placement onto the photobook page, the photobook page having a first dimension and a second dimension wherein the first dimension is greater than the second dimension;
  approximating a square root of the number of images by rounding the square root of the number of images;
  determining a total number of page divisions along the first dimension of the photobook page, wherein the total number of page divisions corresponds to the approximated square root;
  evaluating whether the photobook page is to be divided into a regular array of image areas using a modulus of the number of images and the square root;
  establishing a grid on the photobook page as a regular array when a modulus for the approximated square root and the number of images is zero;
  otherwise, determining a number of image areas to be included in a page division using a ratio of the number of images to the approximated square root, the number of image areas for an irregular array being based on a rounded-up approximation of the ratio for one set of page divisions, and a rounded-down approximation of the ratio for another set of page divisions; and
  distributing the images automatically on the photobook page among the multiple image areas.

13. The computer readable medium of claim 12, the procedure comprising:
  when a modulus for the approximated square root and the number of images is greater than zero, establishing a grid on the photobook page as an irregular array, and evaluating each page division for further division into a multiple number of image areas.

14. The computer readable medium of claim 13, the procedure comprising:
  selecting a first number of page divisions to have a first number of image areas where the first number corresponds to the modulus; and
  selecting a second number of page divisions to have a second number of image areas, wherein the second number is different from the first number.

15. The computer readable medium of claim 14, the procedure comprising:
  randomly selecting a first set of the page divisions, from among the total number of page divisions, to have the first number of image areas.

16. The computer readable medium of claim 15, the procedure comprising:
  dividing the page into page divisions and multiple image areas.

17. The computer readable medium of claim 16, the procedure comprising:
  scaling each image to fit within one of the multiple image areas; and
  positioning each image in a position within its image area.

18. The computer readable medium of claim 17, the procedure comprising:
  refining the position of each image within its image area.

19. The method of claim 18, comprising:
  generating a random number for modifying a border width of each image.

20. A system for automatic layout of a photobook page having a first dimension and a second dimension, wherein the first dimension is greater than the second dimension; comprising:
  means for receiving a number of images for placement onto a photobook page; and
  means for processing the images to approximate a square root of the number of images by rounding the square root of the number of images, to determine a total number of page divisions along the first dimension of the photobook page wherein the total number of page divisions corresponds to the approximated square root, to establish whether the photobook page is to be divided into a regular array of image areas using a modulus of the number of images and the square root; and
  to determine a number of image areas to be included in a page division using a ratio of the number of images to the approximated square root, the processing means establishing a grid on the photobook page as a regular array when a modulus for the approximated square root and the number of images is zero, otherwise the number of image areas for an irregular array being based on a rounded-up approximation of the ratio for one set of page divisions, and a rounded-down approximation of the ratio for another set of page divisions, wherein the processing means distributes the images automatically on the photobook page among the multiple image areas.

21. The system of claim 20, wherein the processing means, when a modulus for the approximated square root and the number of images is greater than zero, establishes a grid on the photobook page as an irregular array and evaluates each page division for further division into a multiple number of image areas.

22. The system of claim 21, wherein the processing means selects a first number of page divisions to have a first number of image areas, where the first number corresponds to the modulus; and selects a second number of page divisions to have a second number of image areas, wherein the second number is different from the first number.

23. The system of claim 22, wherein the processing means randomly selects a first set of the page divisions, from among the total number of page divisions, to have the first number of image areas.

* * * * *